United States Patent
Cideciyan et al.

(10) Patent No.: US 8,185,803 B2
(45) Date of Patent: *May 22, 2012

(54) APPARATUS FOR PROVIDING ERROR CORRECTION CAPABILITY TO LONGITUDINAL POSITION DATA

(75) Inventors: Roy D. Cideciyan, Rueschlikon (CH); Evangelos S. Eleftheriou, Zurich (CH); Glen A. Jaquette, Tucson, AZ (US); Paul J. Seger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1007 days.

This patent is subject to a terminal disclaimer.

(21) Appl. No.: 12/141,962

(22) Filed: Jun. 19, 2008

(65) Prior Publication Data

US 2008/0256423 A1 Oct. 16, 2008

Related U.S. Application Data

(63) Continuation of application No. 11/205,713, filed on Aug. 17, 2005, now Pat. No. 7,421,640.

(51) Int. Cl.
*H03M 13/00* (2006.01)
(52) U.S. Cl. .................... 714/771; 714/785
(58) Field of Classification Search .............. 714/771, 714/785

See application file for complete search history.

(56) References Cited

U.S. PATENT DOCUMENTS

| | | | |
|---|---|---|---|
| 3,854,081 A | 12/1974 | Benaglio | |
| 4,041,287 A | 8/1977 | Kolell et al. | |
| 4,221,995 A | 9/1980 | Barkman | |
| 4,536,809 A | 8/1985 | Sidman | |
| 5,828,513 A | 10/1998 | Greenberg | |
| 5,930,448 A | 7/1999 | Lee et al. | |
| 5,963,386 A | 10/1999 | Assouad | |
| 6,005,727 A | 12/1999 | Behrens et al. | |
| 6,141,176 A | 10/2000 | Blaum et al. | |
| 6,240,332 B1 | 5/2001 | Buttrick et al. | |
| 6,301,511 B1 | 10/2001 | Fujita et al. | |
| 6,462,898 B2 | 10/2002 | Blaum et al. | |
| 7,421,640 B2 * | 9/2008 | Cideciyan et al. ......... 714/771 |

FOREIGN PATENT DOCUMENTS

| | | |
|---|---|---|
| EP | 201230 A2 | 8/1991 |
| JP | 2001067847 A | 3/2001 |
| JP | 2002515622 T | 5/2002 |
| JP | 2004087000 A | 3/2004 |
| JP | 2005166140 A | 6/2005 |

OTHER PUBLICATIONS

"Data Interchange on 12,7 mm 384-Track Magnetic Tape Cartridges—Ultrium-1 Format", Standard ECMA-319, p. 53-54, Jun. 2001.

(Continued)

*Primary Examiner* — Guy Lamarre

(74) *Attorney, Agent, or Firm* — Griffiths & Seaton PLLC

(57) ABSTRACT

A method and apparatus for providing error correction capability to longitudinal position data are disclosed. Initially, data are encoded via a set of even LPOS words and a set of odd LPOS words. The encoded data are then decoded by generating a set of syndrome bits for each of the LPOS words. A determination is then made as to whether or not there is an error within one of the LPOS words based on its corresponding syndrome bits.

5 Claims, 4 Drawing Sheets

OTHER PUBLICATIONS

Jones, DM; Disk File Phase-Encoded Sector Servo Pattern with Data and Reference fields in Each Sector; TDB Jan. 1987, p. 3697-3699.

ECMA International; Standard ECMA-319, Jun. 2001; ECMA Standardizing Information and Communication Systems, "Data Interchange on 12, 7 mm 384-Track Magnetic Tape Cartridges—Ultrium-1 Format"; pp. 1-9 (Title Sheet, Table of Contents only) URL: www.ecma-international.org/flat/publications/Standards/ecma-319.htm.

USPTO Office Action dated Jun. 4, 2008; U.S. Appl. No. 11/205,713; pp. 1-6.

* cited by examiner

APPARATUS FOR PROVIDING ERROR CORRECTION CAPABILITY TO LONGITUDINAL POSITION DATA

PRIORITY CLAIM

The present application is a continuation of U.S. patent application Ser. No. 11/205,713, filed on Aug. 17, 2005, published on Feb. 22, 2007, issued as a patent (U.S. Pat. No. 7,421,640) on Sep. 2, 2008, and entitled, "Method and Apparatus for Providing Error Correction Capability to Longitudinal Position Data," which is incorporated herein by reference.

CROSS-REFERENCE TO RELATED APPLICATIONS

The present application is related to copending U.S. patent application Ser. No. 12/141,960, filed concurrently and incorporated herein by reference.

BACKGROUND OF THE INVENTION

1. Technical Field

The present invention relates to tape storage systems in general. More particularly, the present invention relates to a method and apparatus for providing longitudinal position (LPOS) data in a tape storage system. Still more particularly, the present invention relates to a method and apparatus for providing error correction capability to LPOS words in a tape storage system.

2. Description of Related Art

Tape storage systems remain to be the most efficient and cost-effective means for providing data backup because no other storage technology offers the same low cost and high capacity combined advantage. In addition, tape storage systems have been proven to be very reliable.

By combining the advantages of linear multi-channel bidirectional tape formats in common usage, Linear Tape-Open (LTO) technology has been developed to maximize capacity and performance of tape storage systems. LTO tapes use a tape format that has longitudinally pre-written servo tracks. The servo tracks provide a timing-based track-following position error scheme. The servo tracks contain a repeated pattern of recorded flux transitions that occur in grouped bursts of 5, 5, 4 and 4 transitions. The timing between the sets of five-bursts and between sets of four-bursts provides the position information for track following. Additionally, the individual transitions within the five-bursts are phase-shifted in a manner that encodes longitudinal position information (LPOS) into the servo tracks.

The LPOS information are used to keep track of the longitudinal position of data records written onto or read from a tape, and are used to locate those data records when the reading or writing process temporarily stops. By detecting the phase-encoded LPOS information, a tape storage system is able to determine the tape position relative to landmarks lengthwise down a tape. The LPOS locations of data files on tape are also stored in the volume control data for use to locate the data files during a later tape cartridge load for reading, or for write-appending new files onto the end of the last file written to the tape. The LPOS data are used as the primary positional information for the tape storage servo control system to determine the starting and stopping of a tape, and to back-hitch the tape in order to position the read-write heads at the beginning of a data record at the required velocity and track position that allows the start of a new data transfer operation.

LPOS data typically cannot tolerate any errors. But if a tape drive is reduced to a single channel because other servo heads have been smeared or shorted, a single bit error on that channel can cause a Stop Write condition. Thus, LPOS data have to able to tolerate some level of errors such that the good servo head can continue to operate after an occurrence of an error.

One known solution to the above-mentioned problem is to append Reed-Solomon parity symbols to an LPOS word, but it would increase the length of the LPOS word, and it would cause problems in synchronizing to the LPOS word since Reed-Solomon words are not base-14 as required by the LPOS format in order to allow for synchronization. Another solution is to add a base-14 checksum, but again it would increase the length of the LPOS word, and it only provides error detection but not error correction.

Consequently, it would be desirable to provide an improved method and apparatus for providing error correction capability to LPOS words.

SUMMARY OF THE INVENTION

In accordance with a preferred embodiment of the present invention, data are initially encoded via a set of even LPOS words and a set of odd LPOS words. The encoded data are then decoded by generating a set of syndrome bits for each of the LPOS words. A determination is then made as to whether or not there is an error within one of the LPOS words based on its corresponding syndrome bits.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
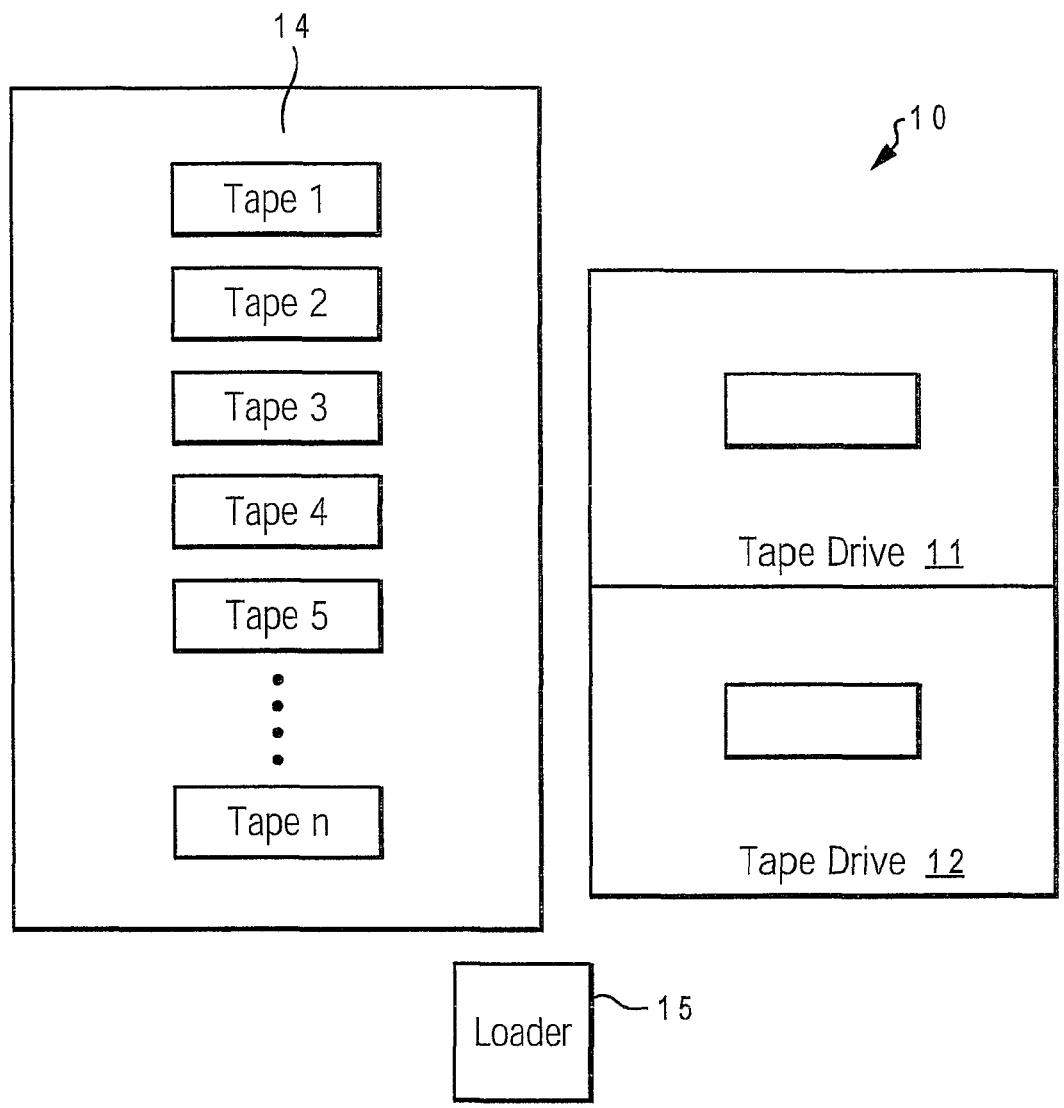
FIG. 1 is a block diagram of a tape library system in which a preferred embodiment of the present invention can be incorporated.

Referring now to the drawings, and specifically to FIG. 1, there is depicted a tape library system in which a preferred embodiment of the present invention can be incorporated. As shown, a tape library system 10 includes tape drives 11-12, a loader 15, and a library of tape cassettes (or cartridges) 14. Loader 15 can fetch any one of tape cassettes 14 and loads it into one of tape drives 11-12.

Figure 2:
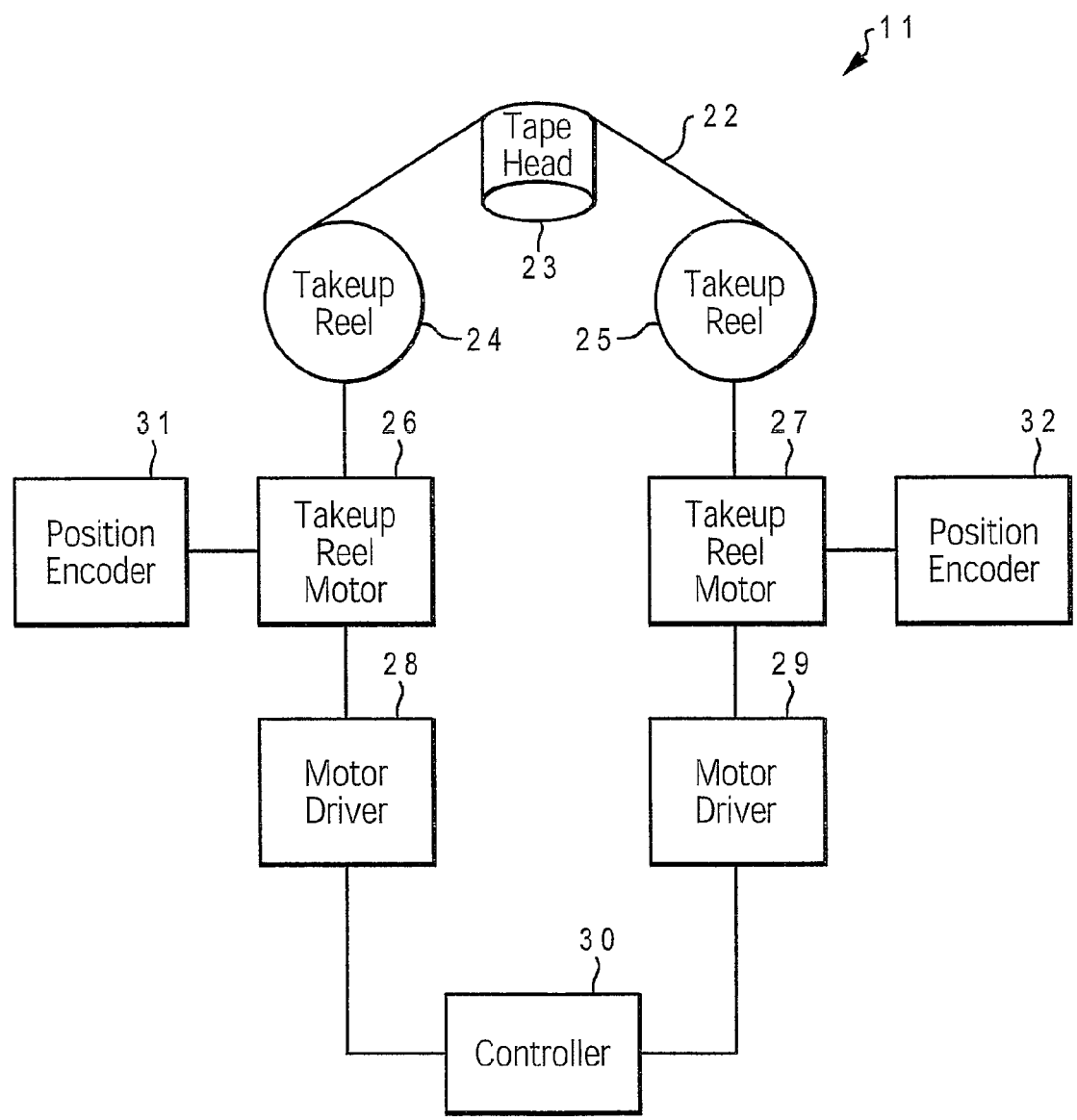
FIG. 2 is a block diagram of a tape drive in which a preferred embodiment of the present invention can be incorporated.

With reference now to FIG. 2, there is depicted a tape drive, such as tape drive 11 from FIG. 1, in which a preferred embodiment of the present invention can be incorporated. As shown, a tape drive 11 includes a tape read/write head 23, takeup reels 24-25 and takeup reel motors 26-27. A magnetic tape 22 is spooled on takeup reels 24-25, and is routed over tape read/write head 23. Tape read/write head 23 reads data from and writes data to magnetic tape 22. Takeup reel motors 26-27 control the positioning of magnetic tape 22 over tape read/write head 23 via takeup reels 24-25, respectively.

In addition, a controller 30 provides control signals to motor drivers 28-29. Motor drivers 28-29, in turn, provide drive signals to takeup reel motors 26-27, respectively. Position encoders 31-32 commutates takeup reel motors 26-27, respectively. longitudinal position (LPOS) information are used to cause controller 30 to move magnetic tape 22 over the entire length of magnetic tape 22, to rewind from the end of magnetic tape 22 to the beginning of magnetic tape 22 and unspool, unthread, etc.

Figure 3:
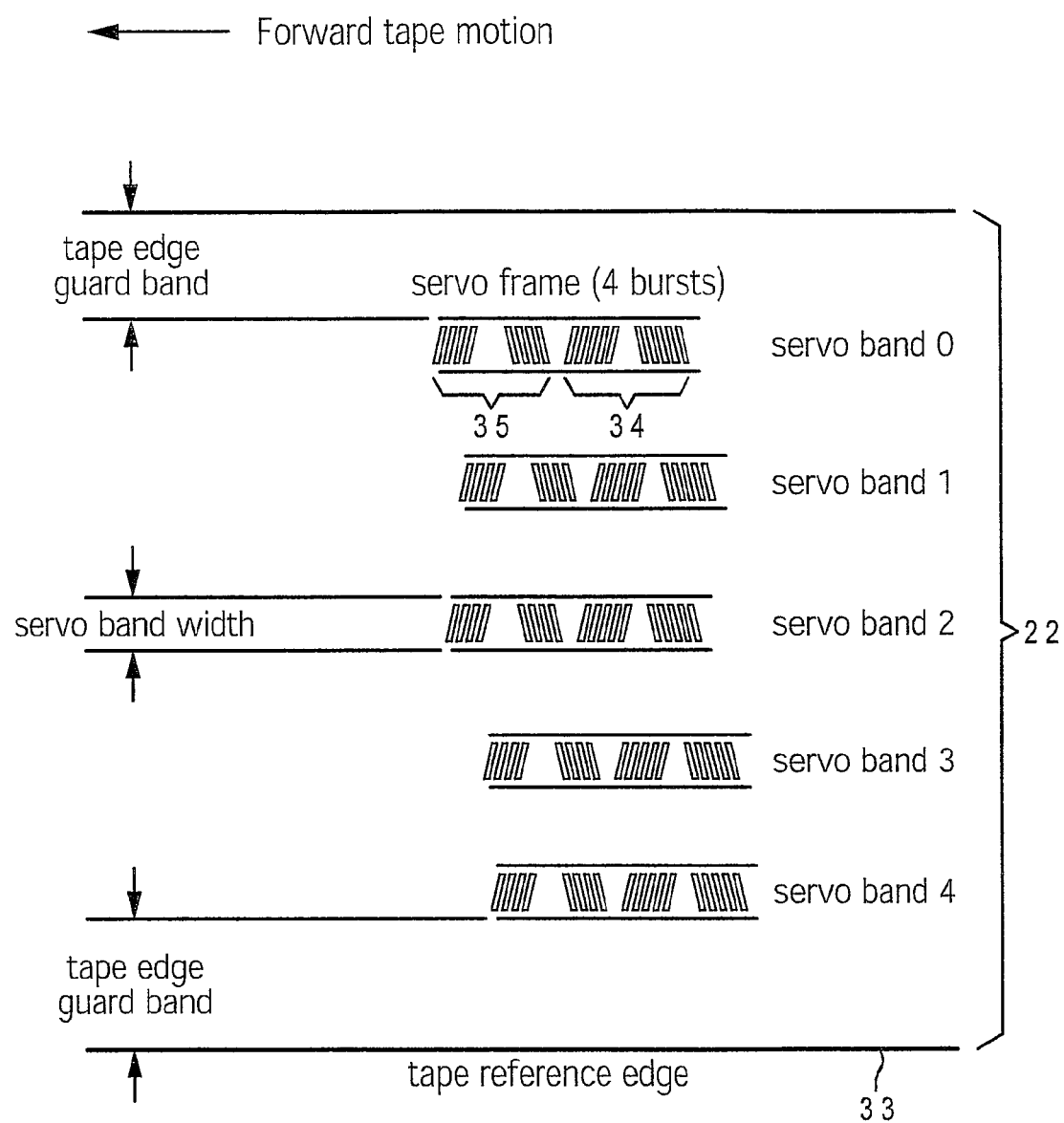
FIG. 3 illustrates a recording format on a magnetic tape, in accordance with a preferred embodiment of the present invention.

Referring now to FIG. 3, there is illustrated a recording format on a magnetic tape, such as magnetic tape 22 from FIG. 2, in accordance with a preferred embodiment of the present invention. As shown, magnetic tape 22 includes servo bands 0-4 to enable an accurate positioning of a tape read/write head over a data track, and to ensure that the tape read/write head does not stray onto an adjacent data track. Servo bands 0-4 are written on magnetic tape 22 at time of manufacture. Each of servo bands 0-4 is located at a specific distance from a tape reference edge 33. Within each of servo bands 0-4 are servo stripes, groups of which make up servo bursts. Four servo bursts make up a servo frame. For example, in servo band 0, a servo frame includes servo bursts 34-35. First two servo bursts 34 contain five flux transitions, and second two servo bursts 35 contain four flux transitions.

In the prior art, an LPOS word includes one sync mark and seven 14-ary symbols (written in a forward tape motion direction), as follows:

Sy,L0,L1,L2,L3,L4,L5,Tx where

Sy is the word sync mark

L0 is the least significant symbol in longitudinal position

L1 is the next most significant symbol in longitudinal position

L2 is the next most significant symbol in longitudinal position

L3 is the next most significant symbol in longitudinal position

L4 is the next most significant symbol in longitudinal position

L5 is the next most significant symbol in longitudinal position

Tx is a symbol of tape manufacturer information

LPOS word symbols are constructed from a set of bit sequences listed in Table I. The most significant bit within each LPOS word symbol is encoded into a servo subframe first. An LPOS word contains 36 bits and has a length of 36 servo frames.

TABLE I

| symbol | bit sequence |
|---|---|
| Sy | 10000000 |
| D | 0001 |
| C | 0010 |
| B | 0011 |

TABLE I-continued

| symbol | bit sequence |
|---|---|
| A | 0100 |
| 9 | 0101 |
| 8 | 0110 |
| 7 | 0111 |
| 6 | 1001 |
| 5 | 1010 |
| 4 | 1011 |
| 3 | 1100 |
| 2 | 1101 |
| 1 | 1110 |
| 0 | 1111 |

In accordance with a preferred embodiment of the present invention, LPOS information is initially represented by an even LPOS word and an odd LPOS word (or vice versa), followed by a group of LPOS words that are made up of a combination of even or odd LPOS words. Each of even and odd LPOS words includes one sync mark and seven 14-ary symbols (written in a forward tape motion direction), as follows:

even LPOS word: Sy,L0,L1,L2,L3,X,Y,Tx odd LPOS word: Sy,L0,L1,L4,L5,X,Y,Tx where Sy is the word sync mark L0 is the least significant symbol in longitudinal position L1 is the next most significant symbol in longitudinal position L2 is the next most significant symbol in longitudinal position L3 is the next most significant symbol in longitudinal position L4 is the next most significant symbol in longitudinal position L5 is the next most significant symbol in longitudinal position Tx is a symbol of tape manufacturer information X, Y are 8 bits of (d=0, k=3) runlength-limited (RLL) constrained error correction code that are encoded as the following 8 bits: a, b, c, 1, d, e, f, 1, where a, b, c, d, e, and f are six parity bits associated with a shortened extended Hamming code (generating a Hamming distance of 4, which is capable of correcting any one-bit error and detecting any two-bit error) over:

even LPOS word: L0, L1, L2, L3, and Tx where L0 is 0, 2, . . . , 12 odd LPOS word: L0, L1, L4, L5, and Tx where L0 is 1, 3, . . . , 13

The two 1's RLL constrain the X,Y bit sequence so that no false Sy is seen.

Mappings for the 14-ary symbols in an even LPOS word (i.e., L0 L1 L2 L3 X Y Tx) and mappings for the 14-ary symbols in an odd LPOS word (i.e., L0 L1 L4 L5 X Y Tx) are as follows:

L0 bits: $u_1 \, u_2 \, u_3 \, u_4$

L1 bits: $u_5 \, u_6 \, u_7 \, u_8$

L2 or L4 bits: $u_9 \, u_{10} \, u_{11} \, u_{12}$

L3 or L5 bits: $u_{13} \, u_{14} \, u_{15} \, u_{16}$

X bits: a b c 1

Y bits: d e f 1

Tx bits: $u_{17} \, u_{18} \, u_{19} \, u_{20}$

LPOS word symbols are constructed from the bit sequences shown in Table I, and for each of L0-L5 and Tx bits, each of $u_i \ldots u_j$ corresponds to a bit in the bit sequence in Table I. For example, if L0=5, then the bit sequence for L0, according to Table I, should be 1010, which means $u_1=1, u_2=0, u_3=1, u_4=0$.

As another example, if L2=8, then the bit sequence for L1, according to Table I, should be 0110, which means $u_9=0$, $u_{10}=1$, $u_{11}=1$, $u_{12}=0$.

An encoder is used to compute the parity bits a, b, c, d, e and f as a function of $u_1 \ldots u_{20}$. Within the encoder, the following computations are performed:

$$a = u_1 \oplus u_5 \oplus u_6 \oplus u_9 \oplus u_{11} \oplus u_{14} \oplus u_{15} \oplus u_{18} \oplus u_{20}$$

$$b = u_1 \oplus u_2 \oplus u_7 \oplus u_{10} \oplus u_{11} \oplus u_{12} \oplus u_{15} \oplus u_{16} \oplus u_{17} \oplus u_{19}$$

$$c = u_2 \oplus u_3 \oplus u_6 \oplus u_8 \oplus u_{11} \oplus u_{12} \oplus u_{13} \oplus u_{17} \oplus u_{18} \oplus u_{20}$$

$$d = u_3 \oplus u_4 \oplus u_7 \oplus u_9 \oplus u_{12} \oplus u_{13} \oplus u_{14} \oplus u_{16} \oplus u_{18} \oplus u_{19}$$

$$e = u_4 \oplus u_5 \oplus u_8 \oplus u_{10} \oplus u_{13} \oplus u_{14} \oplus u_{15} \oplus u_{17} \oplus u_{19} \oplus u_{20}$$

$$f = u_1 \oplus u_2 \oplus u_3 \oplus u_4 \oplus u_5 \oplus u_6 \oplus u_7 \oplus u_8 \oplus u_9 \oplus u_{10}$$

where $\oplus$ stands for an exclusive OR operation (i.e., modulo 2 addition). Preferably, a total of 54 exclusive OR logic gates are required to implement the encoder, and a total of nine exclusive OR gates are used to compute each of the parity bits a-f.

The values of $u_1 \ldots u_{20}$ for forming parity bits a-f are based on a 6×26 parity check matrix $H = [h_1\ h_2\ h_3\ \ldots\ h_{20}\ h_{21}\ h_{22}\ h_{23}\ h_{24}\ h_{25}\ h_{26}]$, where $h_i$ is the $i^{th}$ column vector of matrix H given by:

$$H = \begin{bmatrix} 10001100101001110101100000 \\ 11000010011100111010010000 \\ 01100101001110001101001000 \\ 00110010100111010110000100 \\ 00011001010011101011000010 \\ 11111111110000000000000001 \end{bmatrix}$$

A decoder is used to compute six syndrome bits $s_1 \ldots s_6$. The decoder then determines whether or not there is an error in an LPOS word based on the values of the computed syndrome bits. Within the decoder, the following computations are performed:

$$s_1 = a' \oplus u'_1 \oplus u'_5 \oplus u'_6 \oplus u'_9 \oplus u'_{11} \oplus u'_{14} \oplus u'_{15} \oplus u'_{16} \oplus u'_{18} \oplus u'_{20}$$

$$s_2 = b' \oplus u'_1 \oplus u'_2 \oplus u'_7 \oplus u'_{10} \oplus u'_{11} \oplus u'_{12} \oplus u'_{15} \oplus u'_{16} \oplus u'_{17} \oplus u'_{19}$$

$$s_3 = c' \oplus u'_2 \oplus u'_3 \oplus u'_6 \oplus u'_8 \oplus u'_{11} \oplus u'_{12} \oplus u'_{13} \oplus u'_{17} \oplus u'_{18} \oplus u'_{20}$$

$$s_4 = d' \oplus u'_3 \oplus u'_4 \oplus u'_7 \oplus u'_9 \oplus u'_{12} \oplus u'_{13} \oplus u'_{14} \oplus u'_{16} \oplus u'_{18} \oplus u'_{19}$$

$$s_5 = e' \oplus u'_4 \oplus u'_5 \oplus u'_8 \oplus u'_{10} \oplus u'_{13} \oplus u'_{14} \oplus u'_{15} \oplus u'_{17} \oplus u'_{19} \oplus u'_{20}$$

$$s_6 = f' \oplus u'_1 \oplus u'_2 \oplus u'_3 \oplus u'_4 \oplus u'_5 \oplus u'_6 \oplus u'_7 \oplus u'_8 \oplus u'_9 \oplus u'_{10}$$

where $\oplus$ stands for an exclusive OR operation. Preferably, a total of 60 exclusive OR logic gates are required to compute syndrome bits, and a total of 10 exclusive OR logic gates are used to compute each syndrome bit. The prime notation denotes a received bit (e.g., a' is the received bit a, b' is the received bit b, $u'_1$ is the received bit $u_1$, $u'_2$ is the received bit $u_2$, etc.), which can be potentially in error. The decoder considers three separate cases and makes a decision in each of the three cases as follows.

Case 1: $s_1+s_2+s_3+s_4+s_5+s_6=0$ or 1
In case 1, if all the received 4-bit data nibbles are valid 14-ary nibbles, nothing is done (i.e., no error is corrected in bits $u'_1 \ldots u'_{20}$). In the present example, $u_1=u'_1, \ldots, u_{20}=u'_{20}$ are declared by the decoder, where $u_1 \ldots u_{20}$ are the decoder's data estimates. However, if at least one of the received 4-bit nibbles is not valid, an error detection flag is raised.
Case 2: $s_1+s_2+s_3+s_4+s_5+s_6=2$ or 4 or 5 or 6
In case 2, an error detection flag is raised.
Case 3: $s_1+s_2+s_3+s_4+s_5+s_6=3$
In case 3, depending on the values of the syndrome bits, a particular single bit among bits $u'_1 \ldots u'_{20}$ is "flipped." Specifically, if the syndrome vector in column form is equal to the $i^{th}$ column vector of the parity check matrix H, $i=1, 2, \ldots, 20$, then the $i^{th}$ bit $u'_i$ is "flipped." In other words, if $[s_1\ s_2\ s_3\ s_4\ s_5\ s_6]^t = h_i$, where $i=1, 2, \ldots, 20$, then the $i^{th}$ bit $u'_i$ is "flipped," where t denotes the transpose operation. The decoder then concludes $u_i = u'_i \oplus 1$, and $u_j = u'_j$ if j is not equal to i. If all the data nibbles with the data estimate after error correction $u_i$, where $i=1, 2, \ldots, 20$, are valid 14-ary nibbles, the decoding is complete. However, if one of the data nibbles after error correction is not a valid 14-ary nibble, an error detection flag is raised.

For each new LPOS word sequence, a tape drive needs to first read two LPOS words consecutively in order to fully land a seek position since L0, L1, L2, L3, L4, and L5 are required. But after the first two LPOS words (i.e., L2 through L5) are known and can be updated, only one LPOS word is then required for subsequent updates.

Figure 4:
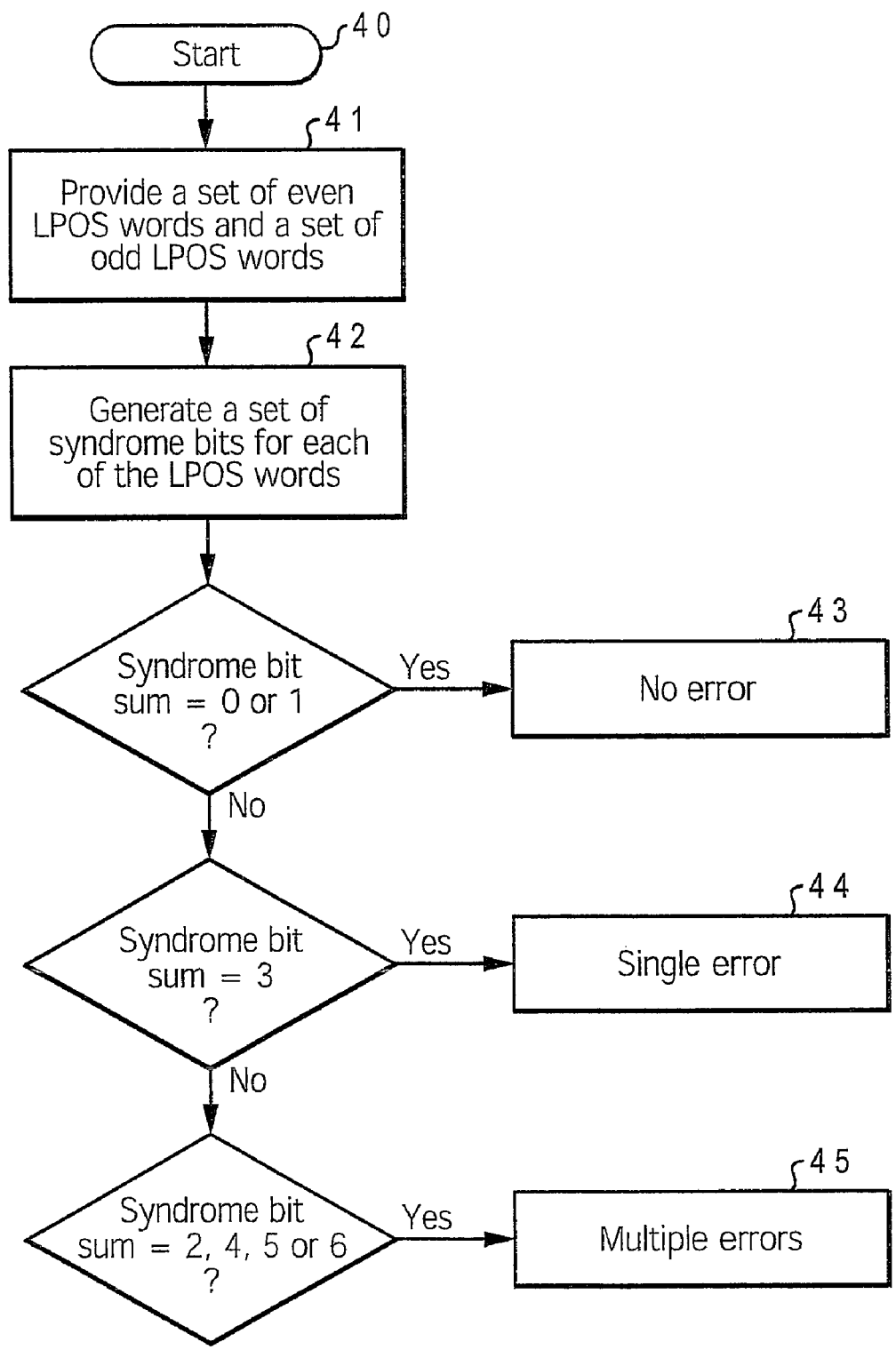
FIG. 4 is a high-level logic flow diagram of a method for providing error correction capability to longitudinal position words within a tape storage system, in accordance with a preferred embodiment of the present invention.

With reference now to FIG. 4, there is depicted a high-level logic flow diagram of a method for providing error correction capability to longitudinal position words within a tape storage system, in accordance with a preferred embodiment of the present invention. Starting at block 40, data are initially encoded via a set of even LPOS words and a set of odd LPOS words, as shown in block 41. The encoded data can be decoded by generating a set of syndrome bits for each of the LPOS words, as depicted in block 42. Then, a determination is made as to whether or not there is an error in an LPOS word based on its corresponding syndrome bits. If the sum of the syndrome bits equals 0 or 1, then there is no error in the LPOS word, as shown in block 43. If the sum of the syndrome bits equals 3, then there is an error in one of the bits of the LPOS word, as depicted in block 44. If the sum of the syndrome bits equals 2, 4, 5 or 6, then there is more than one error in the bits of the LPOS word, as shown in block 45.

As has been described, the present invention provides an improved method and apparatus for providing error correction capability to LPOS words. The method of the present invention allows a single-bit error to be corrected and a double-bit error to be detected without increasing the LPOS word length. The particular (n,k)=(26,20) extended shortened Hamming code that was designed can correct all single errors and detect all double errors. In addition, the method of the present invention can detect 20.77% of all possible triple errors (three errors at any position) and 96.55% of all quadruple errors (four errors at any position).

It is also important to note that although the present invention has been described in the context of hardware, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or compact discs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A tape storage system having error correction capability for longitudinal position (LPOS) words, said tape storage system comprising:

means for encoding data via a plurality of even LPOS words and a plurality of odd LPOS words;

means for decoding said encoded data, wherein said decoding means includes means for generating a plurality of syndrome bits for each of said LPOS words; and means for determining whether or not there is an error within one of said LPOS words based on its corresponding syndrome bits.

2. The tape storage system of claim 1, wherein one of said even LPOS words includes Sy,L0,L1,L2,L3,X,Y,Tx, and one of said odd LPOS words includes Sy,L0,L1,L4,L5,X,Y,Tx where Sy is a word sync mark L0 is the least significant symbol in longitudinal position L1 is the next most significant symbol in longitudinal position L2 is the next most significant symbol in longitudinal position L3 is the next most significant symbol in longitudinal position L4 is the next most significant symbol in longitudinal position L5 is the next most significant symbol in longitudinal position Tx is a symbol of tape manufacturer information X, Y are runlength-limited (RLL) constrained error correction code that are encoded as the following 8 bits: a, b, 1, d, e, f, 1, where a, b, c, d, e, and f are six parity bits associated with a shortened extended Hamming code.

3. The tape storage system of claim 1, wherein said tape storage system further includes means for concluding there is no error in said one LPOS word if a syndrome bit sum of said one LPOS word equals 0 or 1.

4. The tape storage system of claim 1, wherein said tape storage system further includes means for concluding there is a one-bit error in said one LPOS word if a syndrome bit sum of said one LPOS word equals 3.

5. The tape storage system of claim 1, wherein said tape storage system further includes means for concluding there is more than one bit error in said one LPOS word if a syndrome bit sum of said one LPOS word equals 2, 4, 5 or 6.

* * * * *